(12) United States Patent  
Grimland et al.

(10) Patent No.: US 9,504,985 B2  
(45) Date of Patent: Nov. 29, 2016

(54) APPARATUS AND METHODS FOR PRODUCING CHLORINE DIOXIDE

(71) Applicant: Basic Energy Services, L.P., Ft. Worth, TX (US)

(72) Inventors: Kristian E. Grimland, Elizabeth, CO (US); John Charles Sokol, Castle Rock, CO (US)

(73) Assignee: Basic Energy Services, L.P., Ft. Worth, TX (US)

(*) Notice: Subject to any disclaimer, the term of this patent is extended or adjusted under 35 U.S.C. 154(b) by 536 days.

(21) Appl. No.: 14/176,335

(22) Filed: Feb. 10, 2014

(65) Prior Publication Data

US 2014/0154154 A1    Jun. 5, 2014

Related U.S. Application Data

(62) Division of application No. 12/719,372, filed on Mar. 8, 2010, now Pat. No. 8,647,598.

(60) Provisional application No. 61/158,924, filed on Mar. 10, 2009.

(51) Int. Cl.
    *B01J 19/00*    (2006.01)
    *B01J 19/26*    (2006.01)
    *C01B 11/00*    (2006.01)
    *C01B 11/02*    (2006.01)

(52) U.S. Cl.
    CPC .............. *B01J 19/26* (2013.01); *C01B 11/023* (2013.01); *C01B 11/024* (2013.01); *C01B 11/026* (2013.01)

(58) Field of Classification Search
    CPC ......... B01J 19/00; B01J 19/26; C01B 11/00; C01B 11/02; C01B 11/022; C01B 11/023; C01B 11/024; C01B 11/026
    See application file for complete search history.

(56) References Cited

U.S. PATENT DOCUMENTS

| | | | | |
|---|---|---|---|---|
| 3,866,886 A | * | 2/1975 | Thorne | B01F 5/045 366/159.1 |
| 4,770,868 A | * | 9/1988 | Norell | C01B 11/023 423/479 |
| 2005/0244328 A1 | * | 11/2005 | Schmitz | A61L 2/20 423/477 |
| 2006/0178445 A1 | * | 8/2006 | Mcintyre | A01N 59/00 523/122 |

\* cited by examiner

*Primary Examiner* — Natasha Young  
(74) *Attorney, Agent, or Firm* — Dorr, Carson & Birney PC

(57) ABSTRACT

Chlorine dioxide ($ClO_2$) is produced by apparatus and methods wherein a $ClO_2$ gas produced in the apparatus is quickly introduced into a fluid stream to be treated with said gas. To this end, the apparatus has an interior chemical reaction chamber which houses an internal fluid flow tube having a fluid impervious upper section and a porous lower section that respectively define two zones within the interior chemical reaction chamber.

3 Claims, 1 Drawing Sheet

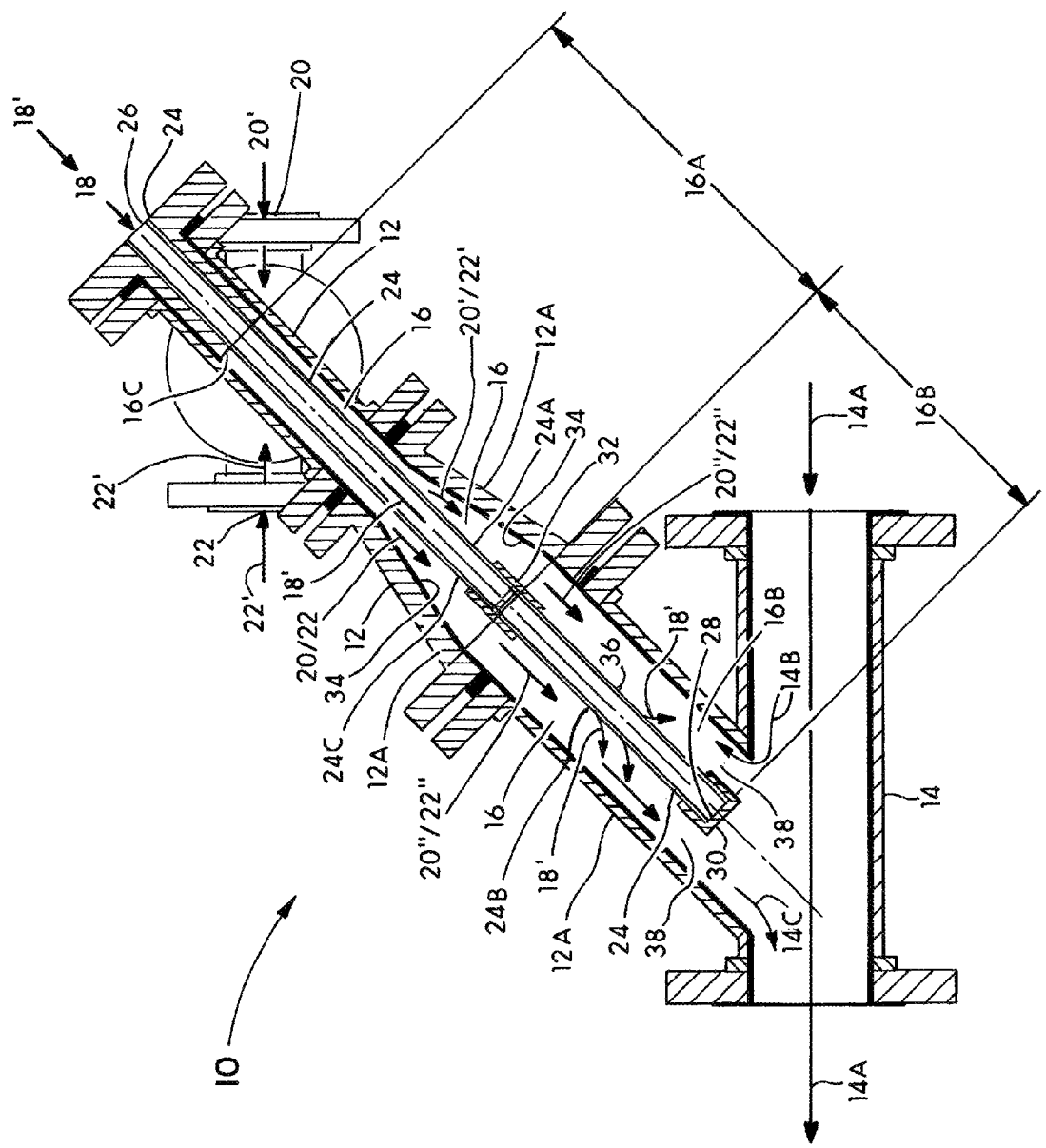

APPARATUS AND METHODS FOR PRODUCING CHLORINE DIOXIDE

RELATED APPLICATIONS

This patent application is a division of the Applicants' co-pending U.S. patent application Ser. No. 12/719,372, now U.S. Pat, No. 8,647,598, entitled "Apparatus and Method for Producing Aqueous Chlorine Dioxide," filed on Mar. 8, 2010, which claims priority to U.S. Provisional Patent Application Ser. No. 61/158,924 filed Mar. 10, 2009.

BACKGROUND OF THE INVENTION

Field of the Invention

This invention is generally concerned with apparatus and methods for producing liquid (e.g., aqueous or non-aqueous liquid systems) chlorine dioxide ($ClO_2$). This compound is normally produced by either oxidation of chlorite compounds such as sodium chlorite ($NaClO_2$) or by reduction of chlorate compounds such as sodium chlorate ($NaClO_3$).

By way of a first example of these technologies, U.S. Patent Application Publication No. US2005/0244328 A1 ("the '328 Publication") teaches use of a chemical reactor that receives three distinct precursor chemicals and chemically reacts them to produce chlorine dioxide gas. These three precursor chemicals are sodium hypochlorite (NaOCl, a halogen donor), sodium chlorite ($NaClO_2$, a chloride donor) and sodium bisulfate ($NaHSO_4$). One likely reaction sequence of these three chemicals is as follows:

$$NaOCl+NaHSO_4 \rightarrow HOCl+Na_2SO_4 \qquad (I)$$

$$HOCl+H \rightarrow \tfrac{1}{2}Cl_2+H_2O \qquad (II)$$

$$NaClO_2+\tfrac{1}{2}Cl_2 \rightarrow NaCl+ClO_2 \qquad (III)$$

That is to say that, per reaction (I), the sodium hypochlorite reacts with sodium bisulfate to produce hypochlorus acid. Per reaction (II), the hypochlorus acid produced by reaction (I) reacts with excess free hydrogen ions to produce chlorine gas in solution (such excess free hydrogen ions result from acidic reaction conditions maintained in the reaction system). Then, in reaction (III), the chlorine gas reacts with the sodium chlorite to produce chlorine dioxide gas.

The '328 Publication also teaches that, for reasons of safety, its reaction chamber must be operated under elevated pressures and within a specified temperature range. Be that as it may, the gaseous chlorine dioxide product formed in the reaction chamber taught by the '328 Publication is then forced through an extended exit pipe (see item number 26 of FIG. 2 of the '328 Publication) and then out of a discharge orifice located at the end of the extended exit pipe 26. Thereafter, the chlorine dioxide gas is injected into a stream of waste water in order to purify it.

U.S. Pat. No. 6,645,457 B2 ("the '457 patent") teaches a vacuum-driven chlorine dioxide generator having a tuned reaction zone in the form of a hollow frustum wherein various precursor ingredients are chemically reacted to form chlorine dioxide gas. The preferred reactants for the practice of this invention are an aqueous solution of sodium chlorite ($NaClO_2$) and chlorine gas ($Cl_2$). In an alternative embodiment, aqueous hydrochloric acid (HCl) and sodium hypochlorite (NaOCl) can be reacted to produce chlorine gas which in turn is reacted with sodium chlorite ($NaClO_2$) to produce chlorine dioxide ($ClO_2$) gas. Using either of these methods, the chlorine dioxide gas is produced according to the idealized reaction:

$$NaClO_2+Cl_2 \rightarrow 2ClO_2(g)+NaCl$$

This gaseous $ClO_2$ is then drawn into a stream of water by means of a vacuum created by water being forced through a jet eductor. Upon being drawn into that water the $ClO_2$ gas is converted into an aqueous chlorine dioxide ($ClO_2$) solution.

It should also be noted here that the $ClO_2$ created in the above-noted frustrum-configured reaction zone must travel, in a gaseous state, through a relatively long column 52 (long—relative to the architecture employed in Applicants' invention as hereinafter more fully explained) before it is educted into the water stream being forced through the jet eductor. That is to say that the $ClO_2$ gas created in the reaction zone continues to exist in a gaseous state while it travels over the relatively long column 52 that connects the reaction zone with the jet eductor.

Background of Invention

These prior art technologies have certain inherent problems. Not the least of these is the fact that, under many commonly encountered operating temperatures and pressures, chlorine dioxide exists as a gas—and that gas can be highly dangerous. Indeed, owing to its proclivity toward (explosive) decomposition, chlorine dioxide gas and/or solutions containing chlorine dioxide (from which the $ClO_2$ could be released during transport) cannot be safely shipped. Hence, $ClO_2$ is generated at the point of use.

Those skilled in this art will appreciate that $ClO_2$ gas educting devices such as the jet eductor taught in the '457 patent are prone to clogging. Hence high quality water must often be, at considerable expense, brought to remote field locations were such jet eductors are employed. It should also be appreciated that such jet eductor devices do not lend themselves to precise control relative to pump driven fluid injection-driven devices. Moreover, jet eductors are inherently incapable of operating over those wide fluid throughput ranges that are commonly required at many jobsites.

SUMMARY OF THE INVENTION

In view of the hazards and/or problems associated with handling chlorine dioxide, the present invention provides chlorine dioxide ($ClO_2$) production apparatus and methods that, among other things, greatly reduces the hazards associated with this chemical. This is achieved by virtue of the fact that Applicants' chlorine dioxide ($ClO_2$) gas product exists in its more hazardous gaseous state for relatively short time periods—that is to say "short time periods" relative to those time periods that $ClO_2$ exists in a gaseous state in those prior art processes wherein gaseous chlorine dioxide must travel through a relatively long pipe before it is dissolved into a fluid such as a liquid. In other words, Applicants' apparatus and methods produce their gaseous $ClO_2$ product relatively later in their overall $ClO_2$ production processes.

This "later" $ClO_2$ gas production follows from the fact that Applicants' gaseous $ClO_2$ product does not come into being until it is relatively closer to the fluid stream into which the $ClO_2$ gas is dissolved. Hence, Applicants' $ClO_2$ gas has relatively less chance to explosively decompose, again owing to the fact that it does not have to travel over an extended length of an exit pipe (such as the one depicted as item 26 in FIG. 1 of the '328 Publication), or up the length of a fluid riser column (such the one depicted as item 52 in FIG. 1 of the '457 patent), before Applicants' chlorine dioxide gas is dissolved into a fluid stream to be treated by said gas. Indeed, upon being formed, Applicants' chlorine dioxide gas product is virtually instantaneously immersed in the fluid to be treated.

In order to accomplish these desirable results, Applicants employ a chemical reactor having an upper mixing and/or reaction zone and a lower distribution and reaction zone. These two zones are created by an interior fluid flow tube that is housed in the chemical reactor. This interior fluid flow tube transports a first precursor chemical through the upper mixing and/or reaction zone and delivers it to the lower distribution and reaction zone. In order to accomplish these two operations, the interior fluid flow tube has a fluid impervious upper section that leads into a lower section that is porous with respect to the first precursor chemical. The porous nature of the walls of the lower section of the interior fluid flow tube serves to create fluid communication between the tube's porous section and the lower distribution and reaction zone of the reaction chamber.

While the interior fluid flow tube operates on the first precursor chemical in the manner described above, a second precursor chemical and a third precursor chemical are separately introduced into the chemical reactor's upper mixing and/or reaction zone. Their resulting mixture and/or reaction product(s) is (are) then pressured into the chemical reactor's lower distribution and reaction zone. This all takes place before said mixing and/or reaction product(s) come into contact with the first chemical precursor ingredient being expelled from the interior fluid flow tube (through its porous lower section) into the reactor's lower distribution and reaction zone. In other words, the first precursor chemical pumped into the interior fluid flow tube only comes into fluid communication with the second precursor chemical/third precursor chemical mixture and/or chemical reaction product(s), to form gaseous chlorine dioxide, after said first precursor chemical enters the lower distribution and reaction zone. It should also be noted here that since the lower distribution and reaction zone is invaded by a portion of the fluid stream into which Applicants' $ClO_2$ gas is to be introduced, the chlorine dioxide gas is dissolved into that fluid stream as soon as said $ClO_2$ gas is formed. Thus, in another sense, Applicants' actual product may also be thought of a chlorine dioxide solution in a (non-reactive) carrier fluid.

BRIEF DESCRIPTION OF THE DRAWINGS

FIG. 1 is a cross section view of a chlorine dioxide generator made according to the teachings of this patent disclosure.

DETAILED DESCRIPTION OF THE INVENTION

FIG. 1 illustrates Applicants' liquid (e.g., aqueous or non-aqueous liquid systems) chlorine dioxide generator apparatus 10. Said apparatus 10 is generally comprised of a chemical reactor 12 whose lower end is in fluid communication with a fluid (e.g., a liquid) to be treated that is passing through a liquid flow device 14 such as a pipe. By way of example only, such a fluid could be: (1) a non-reactive water based carrier fluid; or (2) a non-reactive hydrocarbon rich solution such as oil, crude oil or more purified forms such as xylene, hexane or tolulene; or (3) a carrier fluid of type (1) or (2) that contains oxidizable contaminants to be removed. In cases (1) and (2) the $ClO_2$ is produced and immediately added to the carrier fluid which is then applied as a full strength solution to the contaminated fluid to be treated. In case (3) the chlorine dioxide will begin to react with the contamination present in the carrier fluid as soon as the two are brought into contact resulting in a lower $ClO_2$ concentration in a cleaned (or cleaner) carrier fluid. The depleted $ClO_2$ solution is then used to further treat other contaminated fluids. In any case, the chemical reactor 12 contains a void space 16. This void space 16 can be thought of as having an upper mixing and/or reaction zone 16A and a lower distribution and reaction zone 16B. The general location and linear extent of these respective zones 16A and 16B within the void space 16 is generally delineated by the distances 16A and 16B depicted in FIG. 1.

The chemical reactor 12 has three fluid reactant entry ports 18, and 22 for respectively introducing a first chemical precursor ingredient 18', a second chemical precursor ingredient 20' and a third chemical precursor ingredient 22' into said reactor. These three chemical precursor ingredients ultimately make Applicants' liquid chlorine dioxide product. The first fluid reactant entry port 18 leads into an internal fluid flow tube 24 having an open top end 26 and a closed bottom end 28. For example, the closed bottom end 28 is shown closed by means of a bottom end cap 30. This internal fluid flow tube 24 can be a single piece whose upper section 24A is impervious to fluid flow through its walls and whose lower section 24B is porous with respect to the first chemical precursor ingredient 18'. For example, this lower section 24B can be made porous by virtue of the presence of an array of small openings (e.g., holes, slots and the like) in its walls. In the alternative, the internal fluid flow tube 24 can be comprised of two or more distinct sections made of materials having different wall porosity properties. For example, in FIG. 1 the internal fluid flow tube 24 is shown having an upper section 24A and a lower section 24B that are joined by a tube coupler 32. In either case, since the bottom end 28 of the lower section 24B is capped, any first chemical precursor fluid 18' pumped into the porous lower section 24B will pass through its porous walls and thereupon mix with any second and third chemical precursor ingredients 20' and 22' that have been pressured into the lower distribution and reaction zone 16B of the void space 16 in the reactor component 12.

Again, referring to FIG. 1, it can also be seen that the length of the upper section 24A of the internal fluid flow tube 24 is generally defined by the length 16A of the upper mixing and/or reaction zone 16A. Similarly, the length of the porous lower section 24B generally defines the length of the lower distribution and reaction zone 16B. It might also be noted here that the void space 16 can be thought of as substantially existing between the inside surface 34 of the chemical reactor housing 12A and the outside surface 24C of the internal tube 24. The top of the void space 16 is defined by the inside surface of the top 16C of the chemical reactor 12. The bottom of the void space 16 is open to the flow of a portion of a fluid 14A to be treated that leaves the liquid flow device 14 and invades (and leaves) the lower distribution and reaction zone 16B liquid flow device 14 in the manner generally depicted by direction arrows 14B and 14C in FIG. 1. That is to say that some of the fluid 14A flowing through the fluid flow device 14 will invade the lower distribution and reaction zone 16B and then be expelled from it back into the remainder of the fluid 14A passing through the liquid flow device 14 by the pressures placed upon the chemical precursor ingredients 18', 20' and 22'.

The second chemical precursor ingredient 20' is pumped into the second fluid reactant entry port 20 and then into the upper mixing and/or reaction zone 16A. Similarly, the third chemical precursor ingredient 22' is pumped into the upper mixing and/or reaction zone 16A of the reactor component 12 via the third reactant entry port 22. Thus, any fluid injected through the second fluid reactant entry port 20 and any fluid injected through the third fluid reactant entry port 22 will have the opportunity to mix with each other (and in certain cases chemically react with each other) in the upper mixing and/or reaction zone 16A.

In other words, depending on their chemical identities, certain chemicals hereinafter more fully described, will not only be physically mixed with each other in the upper mixing and/or reaction zone 16A, but also carry out a first chemical reaction in said upper mixing and/or reaction zone 16A. Their mixture products 20'/22', and/or their chemical reaction products 20"/22", are then pressured downward into the lower distribution and reaction zone 16B of the void space 16. Thus, any first chemical precursor 18' that leaves the internal fluid flow tube 24 via its porous lower section 24B and enters the lower distribution and reaction zone 16B can take part in a chemical reaction between said chemical precursor 18' and the mixture products 20'/22', and/or chemical reaction products 20"/22", in order to produce the desired chlorine dioxide ($ClO_2$) gas reaction product. Generally speaking, the first, second and third chemical precursor ingredients will be aqueous systems. Other liquids may however also be employed. Upon forming in the lower distribution and reaction zone, the chlorine dioxide gas is forthwith dissolved into any fluid 14B that has invaded said zone from the liquid flow device 14. Thereafter, all fluids injected under pressure through entry ports 18, 20 and 22 as well as their various mixture and/or reaction products will be driven downward and out of the reactor component 12 (see direction arrow 14C) via the open exit region 38 in the lower end of the lower distribution and reaction zone 16B and into the remainder of the fluid 14A being pumped through the liquid flow device 14.

To these ends, the pressures placed on the first, second and third chemical precursor ingredients 18', 20' and 22' should all be greater than the pressure placed on the fluid stream 14A passing through the fluid flow device 14. Moreover, in order to promote fluid flow through the chemical reactor 12, the pressure placed on the first chemical precursor 18' should be greater than the pressure placed on the second and third chemical precursors 20' and 22'. Nonetheless, owing to the relatively large size of the open exit region 38 of the chemical reactor 12, a portion of the fluid 14A passing through the fluid flow device 14 will invade, circulate in and be expelled from the lower distribution and reaction zone 16B.

Thus, in the embodiment of this invention depicted in FIG. 1, a second/third chemical precursor mixture product 20'/22', and/or a second/third chemical precursor reaction product 20"/22", descending downward into the lower distribution and reaction zone 16B of the void space 16 will come into contact with—and chemically react with—the first chemical precursor 18' being pumped downward through internal tube 24 and forced through its fluid porous lower section 24B into the lower distribution and reaction zone 16B. There, the first chemical precursor will react with any available mixture product 20'/22' and/or reaction product 20"/22" to create a gaseous $ClO_2$ product. This gaseous $ClO_2$ product is then immediately (relative to the times needed to place the $ClO_2$ gases of the '328 Publication and the '457 patent with their respective water streams) forced into solution with any portion of the fluid 14A that invades and leaves the lower distribution and reaction zone 16B.

In some exemplary embodiments of this invention, a chlorite compound such as sodium chlorite ($NaClO_2$) can serve as Applicants' first chemical precursor 18'. It is injected into the top end 26 of the interior fluid flow tube 24. This sodium chlorite is pumped downward and through the fluid porous walls of the lower section 24B of the internal tube 24. Meanwhile, a second chemical precursor ingredient 20' such as sodium hypochlorite (NaOCl) can be pumped via entry port 20 into the upper mixing and/or reaction zone 16A existing between the inside surface 12A of the chemical reactor 12 and the outside surface 24C of the interior tube 24. A third chemical precursor ingredient 22' containing a proton donor, e.g., hydrochloric acid (HCl), sulfuric acid ($H_2SO_4$), or sodium bisulfate ($NaHSO_4$), is also pumped into the upper mixing and/or reaction zone 16A via the third entry port 22. These second and third chemical precursor ingredients will chemically react in the upper mixing and/or reaction zone 16A to produce a chlorine, hypochlorous acid (HOCl) or chlorine gas ($Cl_2$) product. Meanwhile, the first precursor chemical, sodium chlorite ($NaClO_2$), is forced through the porous distribution wall of the lower section 24B of internal fluid flow tube 24 and enters the lower distribution and reaction zone 16B of the void space 16 of the chemical reactor 12. Upon doing this, the sodium chlorite ($NaClO_2$) chemically reacts with the chlorine gas or hypochlorous acid produced by the chemical reaction of sodium hypochlorite (NaOCl) and the proton donor acid compound to produce $ClO_2$ gas in the lower distribution and reaction zone 16B. Whereupon the $ClO_2$ gas dissolves into any portion of the fluid 14A that has invaded the lower distribution and reaction zone 16B.

Applicants have found that hydrochloric acid (HCl) is a particularly effective proton donor. When reacted with sodium hypochlorite (NaOCl), commonly referred to as bleach, it forms sodium chloride (NaCl) and hypochlorous acid (HOCl) according to the reaction of Equation 1.

$$NaOCl + HCl \rightarrow 2ClO_2 + 2NaCl + H_2O \qquad \text{Eq. 1}$$

In this particular process, excess acid, as required to maintain a proton rich environment, is employed to ensure that (essentially) all of the bleach is converted into hypochlorous acid with sufficient excess proton for the next reaction step. The sodium chlorite ($NaClO_2$) is then added to the mixture where it reacts with the hypochlorous acid (HOCl) and the excess acid (HCl) to form chlorine dioxide ($ClO_2$) gas, sodium chloride (NaCl) and water ($H_2O$). This reaction is shown in Equation 2.

$$2NaClO_2 + HOCl + HCl \rightarrow 2ClO_2 + 2NaCl + H_2O \qquad \text{Eq. 2}$$

This is a very fast reaction. Essentially all of the hypochlorous acid is used up and only a small amount of excess HCl is left over. Since all of the hypochlorous acid (HOCl) is consumed, the two reactions can be combined into the simpler overall reaction shown in Equation 3.

$$2NaClO_2 + NcOCl + 2HCl \rightarrow 2ClO_2 + 3NaCl + H_2O \qquad \text{Eq. 3}$$

As has been emphasized throughout this patent disclosure, in its gaseous form chlorine dioxide ($ClO_2$) is very reactive and unstable. Heat, sparks, sunlight, contaminants such as iron, copper, nickel, etc., or certain organic materials such as greases and oils can cause the $ClO_2$ to spontaneously decompose into chlorine ($Cl_2$) and oxygen ($O_2$) as shown in Equation 4.

$$ClO_2 \rightarrow \tfrac{1}{2}Cl_2 + O_2 \qquad \text{Eq. 4}$$

This gas phase decomposition is very exothermic, releasing a great deal of heat. It proceeds until all of the $ClO_2$ present in the gas is used up. This usually happens in a fraction of a second and results in a very sudden temperature and pressure rise. This instability in the gas phase is one of the reasons that $ClO_2$ cannot be shipped and has to be generated at the point of use.

When, however, $ClO_2$ is absorbed into a fluid said $ClO_2$ becomes much more stable. The $ClO_2$ will however still decompose in the presence of contaminants, heat, or sunlight, but the fluid separates the $ClO_2$ molecules apart slowing the decomposition reaction down to the point where there is only a slight loss of $ClO_2$ with no appreciable temperature or pressure rise. It is for this reason that Applicants' process is designed to absorb its $ClO_2$ product into a body of fluid as quickly as it is formed.

In other exemplary embodiments of this invention, sodium chlorate ($NaClO_3$) serves as a first chemical precursor ingredient that is introduced into the first fluid reactant entry port 18 at the top end 26 of the interior fluid flow tube 24. A proton donor in the form of an acid [e.g., hydrochloric acid (HCl) or sulfuric acid ($H_2SO_4$)] is pumped into the second fluid reactant entry port 20. An acid-reducing agent (e.g., methanol ($CH_3OH$), hydrogen peroxide ($H_2O_2$) or sodium chloride (NaCl) is introduced through the third fluid reactant chemical entry port 22. In this embodiment, premixing the proton donor (acid) and the reducing agent can generate the heat required to drive the reaction with the sodium chlorate while at the same time minimizing any "hot spots" in the chemical reactor that could cause the $ClO_2$ to decompose upon formation. In any case, the sodium chlorate that is pumped through the porous material of the lower section 24B of the interior fluid flow tube 24 reacts with the acid-reducing agent/proton donor mixture. This reaction takes place in the lower distribution and reaction zone to produce gaseous $ClO_2$ which then dissolves into any fluid 14B that has invaded the lower distribution and reaction zone 16B.

It might also be specifically noted here that in certain other embodiments of this invention that use chlorate, there need not be a chemical reaction between the second and third chemical precursors. Mixing them together spreads out the heat of dilution and minimizes potential hot spots in the solution that can decompose the chlorine dioxide when it is formed at the chlorate injection point. It also should be understood that while many of the examples above have been described in terms of sodium chlorite ($NaClO_2$), sodium hypochlorite (NaOCl) and sodium chlorate ($NaClO_3$), these are only exemplary compounds that are emphasized because they are so commonly available. In fact, a wide variety of alkali-earth metal salts will work to varying degrees in Applicants' processes. Thus the terms: "alkali-metal" chlorite, alkali metal chlorate, etc. are also applicable to the processes of this patent disclosure. They could, for example, include compounds such as calcium chlorite, calcium hypochlorite, potassium chlorite, etc. Those skilled in this art will also appreciate that when chlorate is used one would have an acid and a reducing agent and, therefore a given selection of the three precursor components will give different by-products along with the $ClO_2$ product.

Those skilled in this art will also appreciate that in the second embodiment described above, the selection of the acid (proton donor) and the acid reducing agent will determine the process chemistry and by-products. For example:

$$NaClO_3+NaCl+H_2SO_4 \rightarrow ClO_2+\tfrac{1}{2}Cl_2+Na_2SO_4+H_2O$$

$$NaClO_3+\tfrac{1}{2}H_2O_2+\tfrac{1}{2}H_2SO_4 \rightarrow ClO_2+\tfrac{1}{2}O_2+\tfrac{1}{2}Na_2SO_4+H_2O$$

$$NaClO_3+2HCl \rightarrow ClO_2+\tfrac{1}{2}Cl_2+NaCl+H_2O$$

$$12NaClO_3+8H_2SO_4+3CH_3OH \rightarrow 12ClO_2+3CH_2O_2+9H_2O+4Na_3H(SO_4)_2.$$

Finally, those skilled in the aqueous chlorine dioxide production arts will appreciate that, while this invention has been described in detail and with reference to certain specific embodiments thereof, various changes and modifications can be made therein without departing from the spirit and scope of this patent disclosure.

Thus having disclosed our invention, what is claimed is:

1. An apparatus for producing chlorine dioxide, said apparatus comprising:
    (1) a chemical reactor having:
        (a) an upper mixing and/or reaction zone for carrying out a first mixing/chemical reaction operation,
        (b) a lower distribution and reaction zone for carrying out a chlorine dioxide gas producing chemical reaction,
        (c) a first chemical precursor entry port that leads into an internal fluid flow tube housed in the chemical reactor,
        (d) a second chemical precursor entry port that leads into the upper mixing and/or reaction zone,
        (e) a third chemical precursor entry port that also leads into the upper mixing and/or reaction zone, and
        (f) an exit port for discharging fluid from the lower distribution and reaction zone into a fluid flow device;
    (2) an internal fluid flow tube having a fluid impervious upper section and a fluid porous lower section, said tube serving to: (a) receive a first chemical precursor, (b) transport that first chemical precursor through the fluid impervious upper section of the internal fluid flow tube and (c) deliver the first chemical precursor into the porous lower section of said internal fluid flow tube whereupon said first chemical precursor is forced through a porous wall region of the porous lower section and into the lower distribution and reaction zone; and
    (3) a fluid flow device that conducts a portion of a fluid passing through said device into and out of the exit port of the chemical reactor in a manner such that any chlorine dioxide gas produced in the lower distribution and reaction zone is dissolved into said portion of the fluid that enters and leaves the lower distribution and reaction zone.

2. The apparatus of claim 1 wherein the internal fluid flow tube is comprised of a fluid impervious upper section and a porous lower section connected to each other by a tube coupling device.

3. The apparatus of claim 1 wherein the internal fluid flow tube is a single piece whose lower region is provided with an array of openings in order to render said lower region porous with respect to the first chemical precursor.

* * * * *